United States Patent

Okamoto

[11] 3,782,237
[45] Jan. 1, 1974

[54] GROUP TRAINING SYSTEMS UTILIZING ELECTRONIC MUSICAL INSTRUMENTS

[75] Inventor: Eisaku Okamoto, Shizuoka, Japan

[73] Assignee: Nippon Gakki Seizo Kabushiki Kaisha, Hamamatsu-shi, Shizuoka-ken, Japan

[22] Filed: Dec. 5, 1972

[21] Appl. No.: 312,266

[30] Foreign Application Priority Data
Dec. 28, 1971  Japan.................................. 47/4342

[52] U.S. Cl..................................... 84/470, 84/1.01
[51] Int. Cl. ........................................... G09b 15/00
[58] Field of Search...................... 84/1.01, 470, 478

[56] References Cited
UNITED STATES PATENTS

| | | | |
|---|---|---|---|
| 3,470,785 | 10/1969 | Shallenberger et al. | 84/470 |
| 3,475,833 | 11/1969 | Andersen | 84/478 X |
| 3,541,915 | 11/1970 | Rhodes | 84/470 |
| 3,584,530 | 6/1971 | Andersen | 84/470 |
| 3,595,120 | 7/1971 | Martin et al. | 84/470 |

*Primary Examiner*—Richard B. Wilkinson
*Assistant Examiner*—U. Weldon
*Attorney*—Solon B. Kemon et al.

[57] ABSTRACT

The group training system comprises a plurality of student stations and a teacher station. Each student station comprises an electronic musical instrument, a headphone connected to the electronic musical instrument through a gate circuit, and a microphone. The teacher station comprises an electronic musical instrument, a headphone connected to this electronic musical instrument, a switch for supplying disenabling signal to the gate circuits of all student stations, a microphone, and other switches for selectively supplying the outputs from the microphone and musical instrument of the teacher station to respective headphones of the student stations and the outputs from respective electronic musical instruments and microphones of the student stations to the headphone of the teacher station, whereby one to one training as well as simultaneous training of a group of students can be attained by interrupting the conduction between the musical instruments of the student stations and the headphones thereof through the operation of the disenabling switch.

7 Claims, 2 Drawing Figures

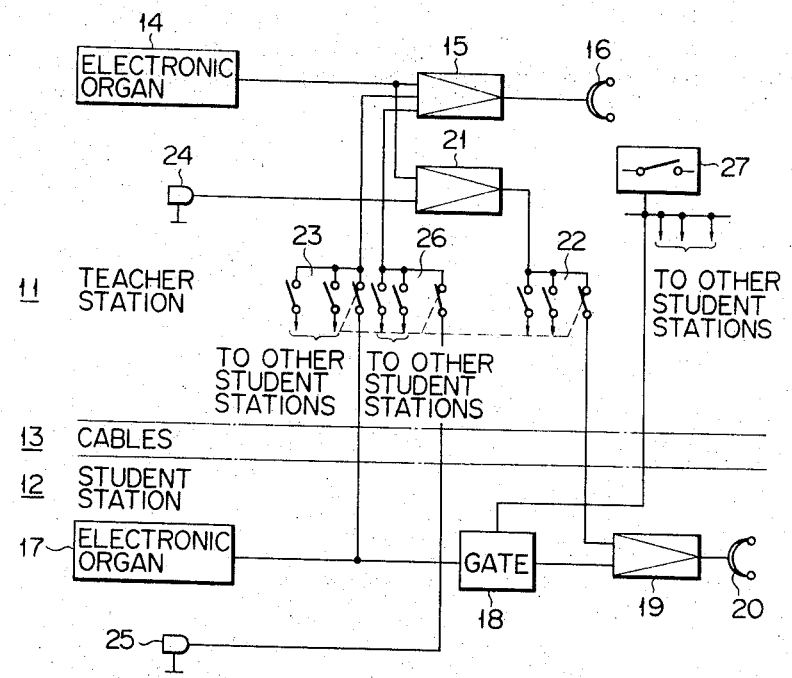
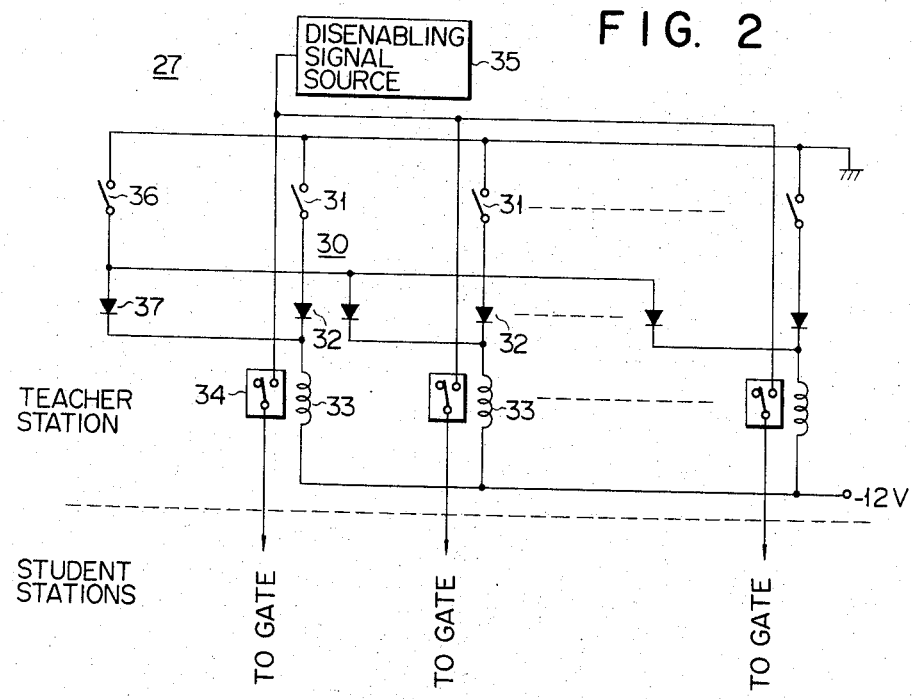

in FIG. 1 comprises a teacher station 11 and a plurality
GROUP TRAINING SYSTEMS UTILIZING ELECTRONIC MUSICAL INSTRUMENTS

BACKGROUND OF THE INVENTION

This invention relates to a system of training a group of students playing electronic musical instruments wherein transmission and reception of played tones and communication between a teacher station and a plurality of student stations can be controlled readily on the teacher side.

Recently, there has been developed a system of training a plurality of students by installing a single teacher station and a plurality of, for example, 20 to 50 student stations, each including an electronic musical instrument. In such a training system, although it is seemingly impossible for the teacher to simultaneously instruct all students it becomes possible to designate a specific student station from the teacher station thereby providing one to one training, by utilizing the fact that the played tones are produced through electric signals. During this one to one training, other students are free to study by themselves. Under these circumstances, the teacher can not transmit an instruction to all students since they are studying by themselves except the specified student. Because, sutdents who are studying by themselves are hearing their played tones of respective electronic musical instruments through their headphones. This is one of the disadvantages of the group training system.

SUMMARY OF THE INVENTION

It is an object of this invention to provide a new and improved group training system of a plurality of students by means of electronic musical instruments wherein a teacher's instruction is transmitted clearly to the student stations from the teacher station thereby enabling an orderly training.

A further object of this invention is to provide an improved group training system of a plurality of students capable of one to one training of a plurality of students by a teacher and of simultaneously transmitting a teacher's instruction to all students.

According to this invention there is provided a group training system utilizing electronic musical instruments, comprising a plurality of student stations, each including a first electronic musical instrument, a first electro-acoustic transducer connected to receive the output from the first electronic musical instrument, a gate circuit connected between the output of the first electronic musical instrument and the first electro-acoustic transducer, and a first acoustic-electrotransducer; and a teacher station including a second musical instrument, a second electro-acoustic transducer connected to receive the output from the second electronic musical instrument, a second acoustic-electrotransducer, means for supplying a disenabling signal to respective gate circuits of the plurality of student stations, a first group of switches for selectively supplying the output from the second acoustic electrotransducer to respective first electro-acoustic transducers of the plurality of student stations, a second group of switches for selectively supplying the outputs from respective first electronic musical instruments of the student stations to the second electro-acoustic transducer, and a third group of switches for selectively supplying the outputs of respective first acoustic-electrotransducer to the second electro-acoustic transducer.

BRIEF DESCRIPTION OF THE DRAWING

FIG. 1 is a block diagram of a group training system embodying the invention; and FIG. 2 shows a connection diagram of a control circuit uitilized by the teacher to control student stations.

DESCRIPTION OF THE PREFERRED EMBODIMENTS

The group training system of this invention illustrated in FIG. 1 comprises a teacher station 11 and a plurality of student stations 12 (for the purpose of simplifying the drawing only one of them is shown) which are interconnected by electric cables 13. The teacher station 11 includes an electronic musical instrument 14 and the tone signals produced thereby are supplied to an electro-acoustic transducer 16 such as a headphone or a loudspeaker through an amplifier 15. Each student station also includes an electronic musical instrument 17 and the tone signals produced thereby are supplied to a headphone 20 via a gate circuit 18 and an amplifier 19. Such gate circuit 18 may be of a field effect transistor or a relay type. The tone generators included in the electronic musical instrument of the teacher station may be utilized as the tone generators of the respective electronic musical instruments of the student stations. As will be described later, the gate circuit 18 is controlled by the teacher station 11.

The tone signals from the electronic musical instrument 14 of the teacher station 11 are also supplied to a second amplifier 21 and the output signal thereof is supplied to the amplifier 19 of the student station 12 via a first group of manually operable switches 22 which are used to selectively designate a plurality of student stations. The tone signals generated by the electronic musical instrument 17 of the student station 12 are supplied to the first amplifier 15 via a second group of manually operable switches 23 which are installed in the teacher station 11 for selectively designating a plurality of student stations. The teacher station 11 and the student station 12 are provided with acoustic-electrotransducers 24 and 25 respectively such as microphones. The output from the microphone 24 is supplied to the second amplifier 21 whereas the output from microphone 25 is supplied to the first amplifier 15 via a third group of manual switches 26 which are used to selectively designate a plurality of student stations. The gate circuits 18 in respective student stations 12 are disenabled, selectively or simultaneously, by a control device 27 in the teacher station 11.

With this training system each student can hear the tone signals produced by his own electronic muscial instrument 17 through the headphone 20. By the selective operation of the second group of switches 23, the teacher can hear the tone signals of any selected student station 12 through the headphone 16. Concurrently therewith by the operations of the first and third groups of switches 22 and 26, the teacher can hear the speech of a student through the microphone 25 and headphone 16 and the student can hear through the headphone 20 the tone signals played by the student the teacher and by himself and teacher's speech through the microphone 24. In this manner, one to one training is possible. As shown by dotted lines, it is advantageous to interlock switches belonging to the first, second and third groups which are associated with the same student station.

In the case of the one to one training, any disenabling signal is not sent to the gate circuit 18 from the control device 27. In this case, students other than under one to one training are studying by themselves and are hearing their tone signals through their headphones.

To simultaneously instruct all students, the teacher operates the control device 27 to send a disenabling signal to the gate circuits 18 of all student stations to interrupt their headphones 20 from respective musical instruments 17, this gives an alarm to all students that the teacher is now going to give an instruction. The teacher's instruction is transmitted to all students through the microphone 24 and respective headphones 20. After transmission of the instruction, the teacher operates the control device 27 for enabling the respective gate circuits 18 of the student stations.

Preferably, the control device 27 is constructed such that it can also disenable the gate circuit 18 of a particular student station. FIG. 2 shows the connection diagram of one example of such a control device.

A plurality of series circuits 30, each including a first manual switch 31, a first diode 32 and a relay coil 33, and of the number equal to the number of the student stations are connected in parallel, and these parallel circuits are connected across a source of supply with a polarity to forwardly bias the diodes 32. When a switch 31 is closed, the relay coil 33 associated therewith operates its contact 34 to connect the gate circuit of a corresponding student station with a source of disenabling signal 35. Furthermore, a series circuit comprising a second manual switch 36 and a second diode 37 is connected in parallel with the serially connected switch 31 and diode 32 of each series circuit 30.

With this control device, it is possible to disenable the gate circuit of a particular student station by the selective operation of the first switch 31 and to disenable the gate circuits of all student stations by the operation of the second switch 36.

What is claimed is:

1. A group training system utilizing electronic musical instruments comprising:
   a plurality of student stations, each including a first electronic musical instrument, a first electro-acoustic transducer connected to receive the output from said first electronic musical instrument, a gate circuit connected between the output from said first electronic musical instrument and said first electro-acoustic transducer, and a first acoustic-electrotransducer; and
   a teacher station including a second electronic musical instrument, a second electro-acoustic transducer connected to receive the output from said second electronic musical instrument, a second acoustic-electrotransducer, means for supplying a disenabling signal to respective gate circuits of said plurality of student stations, a first group of switches for selectively supplying the output from said second acoustic-electrotransducer to respective first electro-acoustic transducers of said plurality of student stations, a second group of switches for selectively supplying the outputs from respective first electronic musical instruments of said student stations to said second electro-acoustic transducer, and a third group of switches for selectively supplying the outputs of respective first acoustic-electrotransducers to said second electro-acoustic transducer.

2. The group training system according to claim 1 wherein each of said first, second and third groups of switches includes the same number of switches as the number of said student stations, and the switches associated with a given student station are interlocked.

3. The group training system according to claim 1 wherein said means for supplying said disenabling signal comprises a plurality of switches of the same number as that of said student stations, said switches operating to selectively supply said disenabling signal to the gate circuits of said plurality of student stations.

4. The group training system according to claim 3 wherein said means further comprises a switch for simultaneously supplying said disenabling signal to the gate circuits of said plurality of student stations.

5. The group training system according to claim 1 wherein said means for supplying said disenabling signal comprises a plurality of series circuits of the same number as that of said student station, each series circuit including a first manually operable switch, a first diode and a relay coil which are connected in series, a source of supply, said series circuits being connected across said source of supply with a polarity for forwardly biasing said first diodes, a source of said disenabling signal, and a plurality of switches respectively operated by said relay coils for connecting said source of disenabling signal to respective gate circuits of said plurality of student stations.

6. The group training system according to claim 5 wherein said means for supplying said disenabling signal further comprises a second manually operable switch, and a plurality of second diodes of the same number as said first diodes, said second switch being connected in parallel with the respective series circuit of said manually operable switches and first diodes through respective second diodes.

7. The group training system according to claim 1 wherein each of said electro-acoustic transducers comprises a microphone and each of said acoustic-electrotransducers comprises a headphone.

* * * * *